(No Model.) 2 Sheets—Sheet 2.

T. A. EDISON.
SYSTEM OF ELECTRICAL DISTRIBUTION.

No. 365,978. Patented July 5, 1887.

ATTEST:
INVENTOR:

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 365,978, dated July 5, 1887.

Application filed November 29, 1886. Serial No. 220,125. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 700,) of which the following is a specification.

The object of my invention is to produce a system for the distribution of electricity for lighting and similar purposes, in which currents of high tension may be used, and consequent economy in the metal required for conductors will be attained, which system shall be of a simple and efficient character and readily and conveniently regulable. In accomplishing this object I provide a divided source of electricity of high tension, consisting of two or more dynamo-electric machines connected in series placed at a suitable building at a place where power may be procured conveniently and economically. A circuit extends from this source of power to two or more sub-stations, at each of which a feeding circuit or circuits are taken off, which extend to a district to be supplied with current. All these sub-stations are in series, and from the main circuit-conductor between the stations compensating conductors extend, which are connected with the points of division of the source of supply. At each sub-station suitable indicating and regulating devices are provided, whereby the electrical condition of the circuits extending therefrom is indicated and regulated, and from each sub-station a circuit extends to the main station or source of supply, with which circuits are connected indicating devices, in accordance with whose indications the generators are regulated according to the requirements of the district supplied from each sub-station. I prefer to connect the districts from the sub-stations on the three-wire or compensating system, but I may arrange them as two-wire systems.

My invention is illustrated in the accompanying drawings, in which—

Figure 1:
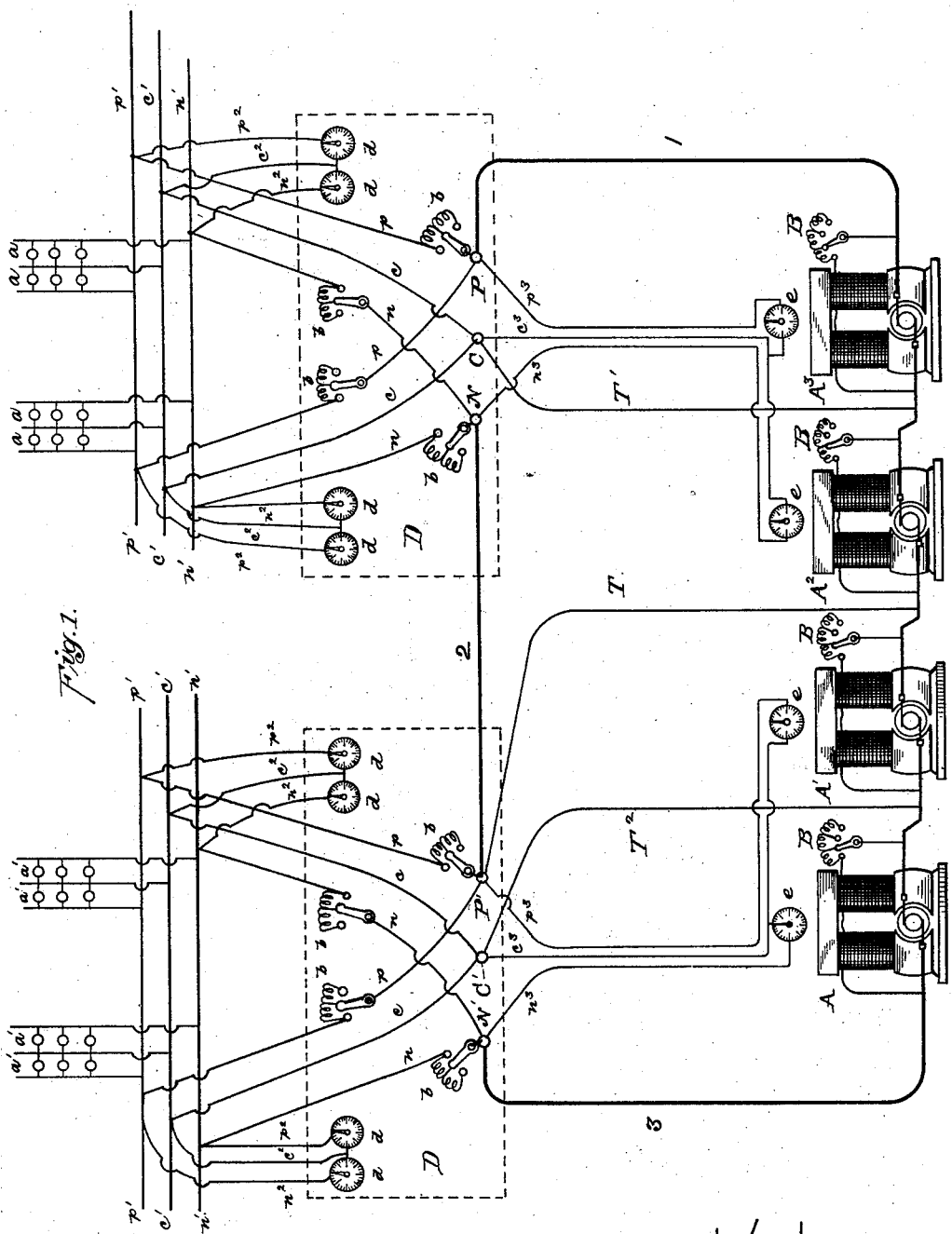
Figure 2:
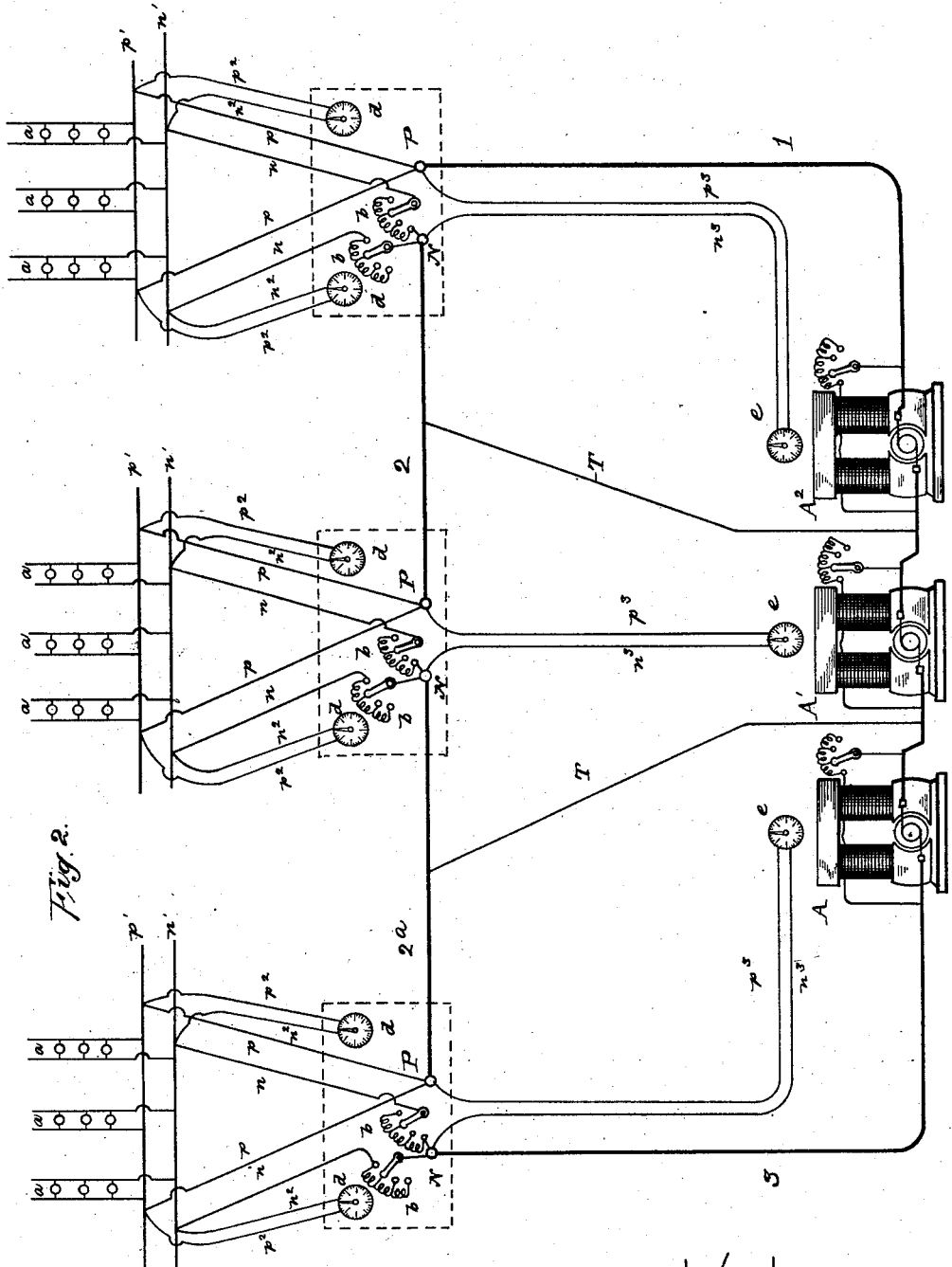

Figure 1 is a diagram of the preferred form, in which the districts are arranged on the three-wire system; and Fig. 2 a diagram of the modified form with each district arranged as a two-wire system.

The invention is particularly applicable to cases where there is a very large area to be lighted or supplied with current from a single source.

Referring, first, more especially to Fig. 1, A, $A'$, $A^2$, and $A^3$ are dynamo-electric machines, all connected in series and situated at a suitable point where the necessary power to operate them can be conveniently and cheaply procured, and which may be for that purpose situated, if necessary, at a considerable distance from the places to be supplied, since the current generated by the series of machines has a high tension and can therefore be economically conveyed by conductors of small mass. Each generator is separately regulable, preferably by means of the adjustable resistances B B, placed in the shunted field-circuit of each machine.

From the terminals of the series of machines a circuit, 1 2 3, extends. D and D' represent sub-stations to which this circuit extends. The dotted rectangles indicate suitable rooms or places into which the conductors are run, and in which the connections are made and the indicating and regulating devices are placed. In the station D the conductor 1 is brought to a suitable terminal point, P, and from a similar terminal point, N, the conductor 2 extends to the next sub-station. There is also a third terminal point, C. From the sub-station extend two feeding-circuits, $p$ $n$ $c$. There are provided any desired number of such feeding-circuits, according to the extent of and number of translating devices in the district supplied. The conductors $p$ extend from terminal P, conductors $n$ from terminal N, and conductors $c$ from terminal C; and these conductors are all connected, respectively, with positive, negative, and compensating lighting or translation circuit-conductors $p'$ $n'$ $c'$, with which the electric lamps or other translating devices $a$ $a$ are connected in multiple series, as is now common in the three-wire system of electrical distribution. Each of the feeding-conductors $p$ $n$ is provided with an adjustable resistance, $b$, whereby the two sides of the sub-system are regulated to keep the same constant pressure at all points on the lighting-circuits, thereby regulating for unequal distribution or changes in the number of translating devices in circuit in the different parts of the district. This regulation is effected in accordance with the showing of indicators $d$ $d$, connected across the conductors of three-wire indicating-circuits $p^2$ $n^2$ $c^2$, one of which extends back from the terminals of each feeding-circuit into the sub-station, and which continually show the pressure at the points where the feeders are connected. The sub-station D' is similarly arranged and equipped, the conductor 2 being carried to the terminal point P' and the conductor 3 from the main source to the terminal N', and the feeders extending from terminals P', N', and C', and supplying translating devices $a'$ $a'$, and being provided with indicating and regulating apparatus precisely as explained with reference to the other station. It will be seen that the conductor 2 connects the two districts supplied from the two sub-stations in series with each other and with the generators at the main station. From any point on the conductor 2 between the sub-stations a conductor, T, extends to the middle point of the series of generators, whereby a divided source of electricity is produced, at whose point of division the compensating conductor T is connected. I have shown the conductor T as extending from the terminal point P' in sub-station D'. The effect is evidently the same as though it were connected anywhere along the line 2 between the sub-stations. It will be usually more convenient to make the connection in the sub-station, as shown.

From the terminal point C in station D a conductor, T', extends, which is connected between the generators $A^2$ and $A^3$—that is, at the middle point of one of the divisions of the source—and from C' in station D' a similar conductor, $T^2$, extends and is connected between generators A and A', the two divisions of the source being thus themselves divided, or, in other words, the source being thus subdivided into four subdivisions. Thus the two districts form a compensating or three-wire system having a divided source and a compensating conductor, while each district is itself a three-wire system having a divided source and a compensating conductor. The translating devices of the two districts are in multiple series with each other—that is, any two devices $a$ $a$ in series in district D are in series with two translating devices $a'$ $a'$ in district D'. There are therefore four translating devices in series, and hence high-tension currents and small conductors are employed. At the same time all the translating devices are independent. In each sub-system, when the number of devices on the two sides becomes unequal, current flows in one direction or the other on conductors $c$ and T' or $T^2$ to maintain the balance, and if the number of devices in one sub-system differs from that in the other the balance is similarly preserved by the compensating conductor T. As stated, the adjustable resistances at the sub-stations are employed to keep a constant pressure at all the feeder terminals, thus regulating for unequal distribution or changes in the number of translating devices in circuit in different parts of the district. Indicating-circuits also extend from the sub-stations to the main station, each of which consists of three conductors, $p^3$ $n^3$ $c^3$, including suitable indicators, $e$ $e$, by means of which the condition of each side of each sub-system is continually shown, and in accordance with which the generators are regulated together or separately to regulate the whole current supplied to the entire system, or that supplied to each sub-system, or that supplied to each side of each sub-system. It is evident that there may be any desired number of sub-stations and districts supplied therefrom, the number of generators at the station being correspondingly increased, so that there will be one or more generators for each side of each sub-system, and conductors being run from between the sub-stations to the points of division, and from the middle terminals of the sub-stations to the points of subdivision of the source. The generators comprising the high-tension source are not necessarily all placed in the same building or at the same place; but they may be placed at two or more different points, they being, however, always connected in series by conductors extending between the different points.

In the above-described system economy is attained not only in conductors, but in other ways also. In the matter of renting or purchasing property for stations, for instance, for the main station may be placed at a distance from the thickly-settled areas to be illuminated, at a point where rents are low or property cheap, while for each of the sub-stations only a small room is necessary, which can be cheaply obtained, it being necessary only to have room enough for the indicators and adjustable resistances. A single attendant is kept at each sub-station, whose only duty is to observe the indicators and adjust the resistances accordingly.

In the modified arrangement shown in Fig. 2 each sub-district is arranged as an ordinary two-wire multiple-arc system, although the general system is a compensating system. Three sub-stations, $D^2$, $D^3$, and $D^4$, are shown supplied with high-tension current from a series of three generators, (or three connected sets of generators,) A, A', and $A^2$. Conductors 2 and $2^a$ connect the sub-stations in series. At each sub-station the circuit is broken, as before described, at terminal points P N, and from these terminals the conductors $p$ $n$ of any desired number of feeding-circuits extend to lighting or translating circuits $p'$ $n'$, with which the translating devices $a$ $a$ are connected in multiple arc. The translating devices of the three districts are in series with each other through the conductors 2 and $2^a$, there being, as shown, three translating devices in series, or as many as there are sub-stations. Each feeding-circuit $p$ $n$ is provided with an adjustable resistance, $b$, for regulating the current conducted by it, and indicating-circuits $p^2$ $n^2$, including indicators $d$, extend to the sub-stations, as before. Indicating-circuits $p^3$ $n^3$ extend from the sub-stations to the main station and are connected with indicators $e$, by whose indications the generators are regulated to affect the entire current supplied to each sub-district or that supplied to the entire system. The conductors T extend back from between sub-stations to the points of division of the source to balance the districts, as already explained.

What I claim is—

1. In a system of electrical distribution, the combination of a main station or source of supply, a main circuit extending therefrom, sub-stations at which the main circuit is broken, two or more feeding-circuits extending from the main-circuit terminals at each sub-station, and a system of connected translation-circuits for each sub station, to which both or all the feeding-circuits from that sub-station are connected at different points, substantially as set forth.

2. In a system of electrical distribution, the combination of a main station or source of supply, a main circuit extending therefrom, sub-stations, circuits extending from the main circuit at such sub-stations, translating devices supplied with current by such sub-station circuits, indicating-circuits extending from the main circuit at such sub-stations to indicating devices at the main station, and means at the main station for regulating the main circuit, substantially as set forth.

3. In a system of electrical distribution, the combination of a main station or source of supply, a main circuit extending therefrom, sub-stations at which said main circuit is broken, feeding-circuits extending from the main-circuit terminals at the sub-stations to translation-circuits, through which the main-circuit connections are completed, means for regulating the pressure on each feeding-circuit, and means at the main station or source of supply for regulating the main circuit, substantially as set forth.

4. In a system of electrical distribution, the combination of a main station or source of supply, a main circuit extending therefrom, sub-stations at which said main circuit is broken, feeding-circuits extending from the main-circuit terminals at each sub-station to translation-circuits, through which the main-circuit connections are completed, indicating-circuits extending from the outer terminals of each feeder to its sub-station, indicating devices connected therewith, means for regulating the pressure at each of said feeding-circuits, indicating-circuits extending from the main circuit at the sub-stations to the main station or source of supply, indicating devices connected therewith, and means at the main station for regulating the main circuit, substantially as set forth.

5. In a system of electrical distribution, the combination of a divided source of electricity, a main circuit extending from one terminal to the other of said source, sub-stations at which said main circuit is broken, circuits extending from the main-circuit terminals at said sub-stations, translating devices supplied by said circuits, through which the main circuit is completed, and conductors extending from the main circuit between the sub-stations to the points of division of the source of supply, substantially as set forth.

6. In a system of electrical distribution, the combination of a divided source of electricity, a main circuit extending therefrom, sub-stations at which said main circuit is broken, circuits extending from the main-circuit terminals at said sub-stations, translating devices supplied by said circuits, through which the main circuit is completed, conductors extending from the main circuit between the sub-stations to the points of division of the source of supply, and means for separately regulating each division of the source of supply, substantially as set forth.

7. In a system of electrical distribution, the combination of two or more electrical generators connected in series, a main-circuit extending from the terminals of the series, sub-stations at which said main circuit is broken, circuits extending from the main-circuit terminals at said sub-stations, translating devices supplied by said circuits, through which the main circuit is completed, conductors extending from the main circuit between the sub-stations to between the generators, and means for regulating each of said generators, substantially as set forth.

8. In a system of electrical distribution, the combination of a divided source of electricity, a main circuit extending therefrom, sub-stations at which the main circuit is broken, feeding-circuits extending from the main-circuit terminals at the sub-stations, translation-circuits connected with said feeding-circuits, through which the main circuit is completed, indicating and regulating devices at the sub-stations for said feeding-circuits, conductors extending from the main circuit between the sub-stations to the points of division of the source of supply, and indicating and regulating devices at the main station for each division of the source of supply, substantially as set forth.

9. In a system of electrical distribution, the combination of a main station or source of supply, a main circuit extending therefrom, sub-stations at which the main circuit is broken and connected to suitable terminals, an additional terminal at each sub-station, a circuit composed of positive, negative, and compensating conductors extending, respectively, from the main-circuit terminals and said additional terminal at each sub-station, translating devices in multiple series supplied from said circuits, through which the main circuit is completed, and a conductor extending from each of said additional terminals to a point of division of the source of supply, substantially as set forth.

10. In a system of electrical distribution, the combination of a source of supply, a main circuit extending therefrom, sub-stations at which said main circuit is broken and connected to suitable terminals, an additional terminal at each sub-station, a circuit composed of positive, negative, and compensating conductors extending, respectively, from said main-circuit terminals and said additional terminal at each sub-station, translating devices in multiple series supplied from said circuits, through which the main circuit is completed, conductors extending from between the sub-stations to points of division of the source of supply, and a conductor extending from each of said additional terminals to a point of subdivision of the source, substantially as set forth.

11. In a system of electrical distribution, the combination of a source of supply, a main circuit extending therefrom, sub-stations at which said main circuit is broken and connected to suitable terminals, an additional terminal at each sub-station, a circuit composed of positive, negative, and compensating conductors extending, respectively, from said main-circuit terminals and said additional terminal at each sub-station, translating devices in multiple series supplied from said circuits, through which the main circuit is completed, conductors extending from between the sub-stations to points of division of the source of supply, and a conductor extending from each of said additional terminals to a point of subdivision of the source, each subdivision of the source being independently regulable, substantially as set forth.

This specification signed and witnessed this 22d day of November, 1886.

THOS. A. EDISON.

Witnesses:
WM. PELZER,
E. C. ROWLAND.